United States Patent [19]

Amariti

[11] 4,201,685

[45] May 6, 1980

[54] LIQUID DEVELOPERS FOR ELECTROSTATIC IMAGES COMPRISING AN ALIPHATIC HYDROCARBON, BINDER, POLYMERIC CARBAMATE AND A CRESOL

[75] Inventor: Luigi Amariti, Niles, Ill.

[73] Assignee: DeSoto, Inc., Des Plaines, Ill.

[21] Appl. No.: 968,013

[22] Filed: Dec. 11, 1978

[51] Int. Cl.$^2$ .............................................. G03G 9/12
[52] U.S. Cl. ............................. 430/114; 106/308 N; 260/33.6 UB; 430/117; 430/119
[58] Field of Search ............... 526/301; 260/33.6 UB; 252/62.1; 106/308 N; 427/15, 16, 17

[56] References Cited

U.S. PATENT DOCUMENTS

| 3,078,231 | 2/1963 | Metcalfe et al. | 252/62.1 L |
| 3,503,936 | 3/1970 | Minsk | 526/301 |
| 3,770,637 | 11/1973 | Okuno et al. | 252/62.1 L |
| 4,075,152 | 2/1978 | Taller | 106/308 N |

*Primary Examiner*—John D. Welsh
*Attorney, Agent, or Firm*—Dressler, Goldsmith, Clement, Gordon & Shore

[57] ABSTRACT

A liquid developer for developing electrostatic images comprises a dispersion in aliphatic hydrocarbon solvent of particles of imaging material, binder and polymeric carbamate having a linear carbon backbone and carbamate side chains in which the carbamate groups contain at least one alkyl group having at least 5 carbon atoms carried by the nitrogen atom thereof, the binder and the polymeric carbamate are soluble in the hydrocarbon solvent when hot and insoluble in said hydrocarbon solvent at room temperature so as to be present in co-precipitated form in the developer.

14 Claims, No Drawings

LIQUID DEVELOPERS FOR ELECTROSTATIC IMAGES COMPRISING AN ALIPHATIC HYDROCARBON, BINDER, POLYMERIC CARBAMATE AND A CRESOL

TECHNICAL FIELD

This invention relates to liquid developers for electrostatic images.

BACKGROUND ART

The formation and development of images on the surface of photoconductive materials by electrostatic means is well known. The usual procedure involves (see U.S. Pat. No. 2,297,691) placing a uniform electrostatic light image on the charged photoconductive surface to discharge the irradiated areas, and this leaves the remainder of the surface in a charged condition. The resulting electrostatic image is rendered visible by depositing on it a finely divided electroscopic marking material which is held electrostatically to the charged areas of the surface. This powder image may then be transferred to a sheet of paper and permanently affixed to it by heat fusion or in some other fashion.

Development of an electrostatic latent image may also be achieved by liquid rather than dry developer materials. In conventional liquid development, commonly referred to as electrophoretic development, an insulating liquid vehicle having finely divided solid imaging material dispersed therein together with dissolved resinous binding material contacts the photoconductive surface in both charged and uncharged areas. The dispersed imaging particles migrate toward the charged areas of the surface, and this migration of charged particles results in their deposition on the charged areas of the photoconductor, thus rendering the electrostatic image visible. The separation of the suspended particles (e.g. carbon black) from the insulating liquid and the binder dissolved therein is incomplete. It is estimated, in the case of carbon black, that the deposited carbon particles contain roughly ten times their weight of insulating liquid absorbed thereon. It is this absorbed liquid that is responsible for the fixing of the image upon evaporation of the volatile portion of the solution.

A typical conventional liquid developer (see for example U.S. Pat. No. 3,890,240) will contain 0.044% of carbon black and 0.36% of resinous binder (a pigment to binder ratio of 1 to 8). However, the actual amount of binder carried by one gram of carbon black and deposited on the charged areas by electrophoresis will be only 0.36 g. This pigment to binder ratio is inadequate for proper fixing of the image, particularly when the image is to be transferred from the photoconductive surface to a sheet of plain paper. Moreover, the amount of resinous binder in the liquid developer cannot be increased substantially since electrophoretic liquid developers require low viscosity to achieve rapid development without considerable background deposition. This invention is concerned with increasing the amount of resinous binder deposited with the imaging pigment in a low viscosity liquid developer adapted for rapid development.

DISCLOSURE OF INVENTION

In accordance with this invention, an alkyl-substituted polyvinyl carbamate is dissolved in hot aliphatic hydrocarbon solvent having dissolved therein the desired resinous binding material which is selected to be insoluble in the hydrocarbon solvent at room temperature. This provides the binder in particulate form so it can also respond electrophoretically and concentrate in the charged areas on the photoconductive surface along with the dispersed particles of imaging material. The alkyl-substituted polyvinyl carbamate is essential for, in its absence, the binder particles which precipitate when the hydrocarbon solvent cools will agglomerate to form a useless agglomerated mass. In the presence of the alkyl-substituted polyvinyl carbamate, the particles of precipitated binder are kept apart by the polyvinyl carbamate, so agglomeration is avoided and a stable suspension is provided. When imaging particles are present in this suspension, both the imaging particles and the binder particles move together under the electrophoretic forces established by the charged areas on the photoconductive surface, so both are concentrated, and both may be transferred together onto a sheet of plain paper. When this coated paper is heated, the hydrocarbon solvent evaporates and the pigment and binder fuse together into a permanent image.

The action of the alkyl-substituted polyvinyl carbamate to prevent agglomeration and to permit electrophoretic mobility is surprising.

The imaging materials which are used in finely divided form and their proportion of use are both conventional. Suitable imaging materials are illustrated by carbon black, phthalocyanine blue, mogul red, nigrosine, thioflavin TG, etc.

The polarity of the suspended particles can be controlled or enhanced by the addition of a small amount of known agents for this purpose. Examples of these are lecithin, petroleum sulfonates, barium or calcium salts of dinonyl-naphthalene sulfonic acid, 2,2,4-trimethyl-1,3-pentanediol, oil soluble polyurethane resins, alkylated polyvinyl pyrrolidones, if negatively charged particles are required. When positively charged particles are desired, cobalt, zirconium or manganese octoate are suitable.

The polymeric alkyl-substituted carbamates which are used herein are, per se, known materials and have a linear carbon chain as the backbone and mono- or di-substituted carbamate side chains having the formula:

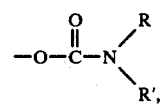

where R is an alkyl group having at least 5 carbon atoms, preferably from 11 to 18 carbon atoms, and R' is hydrogen or a $C_1$-$C_{22}$ alkyl group.

The carbamate group can be carried in diverse ways. Thus, one can make polyvinyl acetate which is hydrolyzed from 25% to 100% to the alcohol form and react that with the desired monoisocyanate of the formula R-N=C=O. In the same manner, one can use a polymer or copolymer of hydroxyethyl acrylate. Also, one can employ an allyl or methallyl carbamate which can be substituted before or after polymerization.

Homopolymers are preferred, but copolymers with up to 75% by weight of copolymerizable monoethylenically unsaturated monomers which contain no functional group other than the single double bond may be present. Styrene, methyl methacrylate, acrylonitrile, vinyl acetate, and ethyl acrylate will illustrate suitable comonomers. Solution polymers and copolymers are particularly contemplated. The polymers are selected to be soluble in hot aliphatic hydrocarbon solvent and sufficiently insoluble in the same solvent at room temperature as to cause substantial precipitation. These polymers are available in commerce, for example, N-octadecyl polyvinyl carbamate is available as a 10% solution in toluene from East Shore Chemical Company, 1221 Barry Ave., Muskegon, Mich., under the trade designation Escoat P-20 and will be used as illustrative. This polymer is known for use as a release coating.

The binder resin is again selected to provide the desired solubility in hot aliphatic hydrocarbon solvent and poor solubility in the same solvent at room temperature. Solution polymerized n-butyl methacrylate will illustrate a suit-resin, but polyethyl acrylate and copolymers with methyl methacrylate, 2-ethylhexyl acrylate or acrylonitrile will further illustrate the variations which are possible. It is stressed that the provision of binder resins having the desired limited solubility in aliphatic hydrocarbons (mineral spirits) is rather simple. The problem is to prevent the precipitating polymer particles from agglomerating, and to enable electrophoretic mobility, and these attributes are not determined by the binder resin.

As a secondary feature of the invention, it is desired to increase the solvency of the hot aliphatic hydrocarbon so that more binder can be dissolved and to do so without unduly increasing the conductivity of the solvent. This is achieved herein by employing a controlled proportion (0.5–5%, preferably from 1–3%) of a cresol having one or more tertiary alkyl substituents, preferably 2,6-di-t-butyl-para-cresol. All proportions herein are by weight unless otherwise stated.

The proportion of pigment can vary from about 0.07% to about 3%, but is preferably about 1% to about 1.5%, based on the weight of the final liquid developer.

The binder concentration will vary from about 5% to about 100% of the weight of the pigment, preferably about 15% to about 40%, and it will be understood that these small amounts are useful herein because the suspension form of the binder allows it to be concentrated electrophoretically. When the prior dissolved resins were used, electrophoretic concentration of the pigment greatly reduced the amount of liquid in the deposited layer, and this limited the amount of resin deposited. To maintain enough binder to hold the pigment previously required dissolving a large amount of binder in the liquid phase, and this made the developer liquid too viscous for rapid development. In contrast, the liquid developers of this invention are of reduced viscosity.

The ratio of binder resin to substituted carbamate polymer can vary considerably so long as there is enough substituted carbamate polymer to prevent agglomeration of the precipitated binder resin. Thus, the weight ratio of binder resin to carbamate polymer can broadly vary from 1:10 to 8:1, but is preferably 1:4 to 1:1.

The aliphatic hydrocarbon solvent (mineral spirits) is selected in conventional fashion for its distillation range, distillation in the range of 300°–350° F. being preferred. The selection here is no different that it was in the past.

The invention is illustrated in the following Example.

BEST MODE FOR CARRYING OUT THE INVENTION

The following materials are charged to a ball mill and milled for 24 hours.

| Item | Weight (grams) |
|---|---|
| 1 - homopolymer of n-butyl methacrylate dispersed in mineral spirits (45%) [see note 1] | 4 |
| 2 - carbon black powder (see note 2) | 10 |
| 3 - N-octadecyl polyvinyl carbamate in 10% solution in toluene (see note 3) | 30 |
| 4 - alkylated polyvinyl pyrrolidone (see note 4) | 2 |
| 5 - 2,6-di-t-butyl-para-cresol | 30 |
| 6 - mineral spirits (distillation range 323–342° F.) [see note 5] | 38 |

Note 1 - Acryloid F-10 of Rohm & Haas may be used.
Note 2 - Raven 410 from Columbia Carbon Company may be used.
Note 3 - Polyvinyl alcohol reacted with a stoichiometric proportion of octadecyl monoisocyanate. Escoat P-20 from East Shore Chemical Co. may be used.
Note 4 - Garex V-216 of GAF Corporation may be used.
Note 5 - isopar G of Exxon Corporation may be used.

The milled dispersion is heated to 65° C. and is stirred into 1400 grams of additional mineral spirits (same as in item 6). The product is a low viscosity stable dispersion which electrophoretically deposits an image on a charged surface with great rapidity, and despite the rapidity of deposition and the low viscosity, the deposit contains enough resin to form a permanent image when it is fused by the heat employed to drive off the mineral spirits.

INDUSTRIAL APPLICABILITY

The liquid developers of this invention are used to develop electrostatic images. This image can be formed and developed on a paper substrate having a photoconductive zinc oxide coating thereon, as well as a photoconductive selenium surface or other organic and/or inorganic photoconductors and the developed wet image containing pigment, binder resin, carbamate polymer and residual liquid can be transferred to a plain paper sheet which is then exposed to heat to drive off the small amount of residual mineral spirits and provide a dry print with the developer fused thereon.

What is claimed is:

1. A liquid developer for developing electrostatic images comprising a dispersion in aliphatic hydrocarbon solvent of particles of imaging material, binder and polymeric carbamate having a linear carbon backbone and carbamate side chains in which the carbamate groups contain at least one alkyl group having at least 5 carbon atoms carried by the nitrogen atom thereof, said binder and said polymeric carbamate being soluble in said hydrocarbon solvent when hot and insoluble in said hydrocarbon solvent at room temperature so as to be present in coprecipitated form in said developer.

2. A liquid developer as recited in claim 1 in which the weight ratio of said binder to said polymeric carbamate is in the range of from 1:10 to 8:1.

3. A liquid developer as recited in claim 1 in which at least 25% of the side chains of said polymeric carbamate contain substituted carbamate groups.

4. A liquid developer as recited in claim 3 in which said substituted carbamate groups have the formula

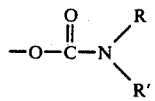

in which R is an alkyl group containing from 11–18 carbon atoms and R' is selected from hydrogen and alkyl groups containing from 1–18 carbon atoms.

5. A liquid developer as recited in claim 1 in which the proportion of imaging material is from about 0.07% to about 3% of the weight of the developer.

6. A liquid developer as recited in claim 5 in which said imaging material is carbon black.

7. A liquid developer as recited in claim 6 in which said binder is present in an amount of from about 5% to about 100% of the weight of the carbon black.

8. A liquid developer as recited in claim 1 in which said polymeric carbamate is a polyvinyl alcohol reacted with a monoisocyanate having the desired substituent.

9. A liquid developer as recited in claim 1 in which said developer contains from 0.5–5% of a cresol having one or more tertiary alkyl substituents.

10. A liquid developer as recited in claim 9 in which said cresol is 2,6-di-t-butyl-para-cresol.

11. A liquid developer as recited in claim 1 in which said hydrocarbon solvent is mineral spirits which distils within the range of 300°–350° F.

12. A liquid developer as recited in claim 11 in which said binder resin is a solution polymer of n-butyl methacrylate.

13. A liquid developer as recited in claim 1 in which said developer further contains an agent which enhances electrophoretic response.

14. A method of producing a liquid developer as recited in claim 1 in which said binder and said polymeric carbamate are dissolved in hot aliphatic hydrocarbon solvent and milled with said imaging material and then diluting said hot solution with additional hydrocarbon solvent at about room temperature to cause said binder and polymeric carbamate to coprecipitate.

* * * * *